(12) United States Patent
Aho (10) Patent No.: US 11,242,294 B2
(45) Date of Patent: Feb. 8, 2022

(54) PASSIVE DIGESTION (71) Applicant: Richard Aho, Marquette, MI (US)

(72) Inventor: Richard Aho, Marquette, MI (US)

( * ) Notice: Subject to any disclaimer, the term of this patent is extended or adjusted under 35 U.S.C. 154(b) by 338 days.

(21) Appl. No.: 15/867,792

(22) Filed: Jan. 11, 2018

(65) Prior Publication Data

US 2018/0155253 A1 Jun. 7, 2018

Related U.S. Application Data

(63) Continuation-in-part of application No. 14/183,197, filed on Feb. 18, 2014, now Pat. No. 9,902,638, which is a continuation-in-part of application No. 12/500,597, filed on Jul. 10, 2009, now abandoned.

(60) Provisional application No. 61/134,647, filed on Jul. 11, 2008.

(51) Int. Cl.

| C05F 17/00 | (2020.01) |
|---|---|
| C05F 17/10 | (2020.01) |
| C05F 17/60 | (2020.01) |
| C02F 11/04 | (2006.01) |
| C02F 11/02 | (2006.01) |
| C02F 3/30 | (2006.01) |
| C05F 17/907 | (2020.01) |
| C05F 17/979 | (2020.01) |
| C05F 17/986 | (2020.01) |

(52) U.S. Cl.
CPC .............. *C05F 17/15* (2020.01); *C02F 3/301* (2013.01); *C02F 11/02* (2013.01); *C02F 11/04* (2013.01); *C05F 17/10* (2020.01); *C05F 17/60* (2020.01); *C05F 17/907* (2020.01); *C05F 17/979* (2020.01); *C05F 17/986* (2020.01); *Y02P 20/145* (2015.11); *Y02W 10/20* (2015.05); *Y02W 10/37* (2015.05); *Y02W 30/40* (2015.05)

(58) Field of Classification Search
CPC ....................................... C05C 11/08
See application file for complete search history.

(56) References Cited

U.S. PATENT DOCUMENTS

| 9,902,638 | B2 * | 2/2018 | Aho | .................. B09B 1/004 |
|---|---|---|---|---|
| 2003/0024686 | A1 * | 2/2003 | Ouellette | ................. C05F 17/60 165/47 |
| 2008/0022739 | A1 * | 1/2008 | Aswani | .................. C05F 17/955 71/6 |
| 2010/0010089 | A1 * | 1/2010 | Van Dyke | ............. C05F 17/986 514/568 |
| 2012/0279266 | A1 * | 11/2012 | Van Dyke | ............... C05F 11/02 71/21 |
| 2016/0332927 | A1 * | 11/2016 | Hofstede | ............... C05F 17/979 |

* cited by examiner

*Primary Examiner* — Wayne A Langel (57) ABSTRACT

This invention is a method for the processing of organic materials or organic wastes in a cost-effective and environmentally sound manner. The invention works both in the anaerobic or aerobic state. Processing organic material is accomplished by forcing the flow of gas through a pile of material, containing some organic matter, with liquids and gravity. The movement of gas and liquids through the pile results in very large increases in microorganism populations, accelerated evolution of the microorganisms, and corresponding increases in the processing provided organic materials.

4 Claims, 8 Drawing Sheets

PASSIVE DIGESTION

CROSS-REFERENCE TO RELATED APPLICATION

This application is a continuation in part of application Ser. No. 14/183,197. application Ser. No. 14/183,197 is a continuation in part of application Ser. No. 12/500,597 filed Jul. 10, 2009. application Ser. No. 12/500,597 claims Provisional application No. 61/134,647 dated Jul. 11, 2008.

This application incorporates by reference U.S. Pat. No. 7,250,287, application Ser. No. 12/500,597, and application Ser. No. 14/183,197 in their entirety. U.S. Pat. No. 7,250,287, is the "Transformer" aerobic digestion method, a system for treating biodegradable waste material through aerobic degradation. The entire U.S. Pat. No. 7,250,287 is incorporated by reference and portions of U.S. Pat. No. 7,250,287, application Ser. No. 12/500,597, and application Ser. No. 14/183,197 and in addition to being part of this specification in their entirety, are included in this document for ease and clarity during examination.

This invention is not the result of research sponsored by the Federal government.

BACKGROUND OF THE INVENTION

The Field of the invention per US patent classification definitions is Human Necessities.

The description of related art includes landfill, anaerobic digesters, all types of composting systems, conventional wastewater treatment systems, and remediation systems.

The description of prior art problems include:
costly
inefficient
damages the environment
inflexible
large scale systems are required
energy-intensive
unsustainable All these problems are solved or greatly reduced by the current invention.

BRIEF SUMMARY OF THE INVENTION

The current invention solves the problem of unsustainable practices with regards to organic materials. The invention uses the biological power of exponential growth of microorganisms to achieve protection of resources. The invention avoids the waste of organic resources and the ecological damage of the unsustainable practices associated with the current handling of currant handling of organic materials or organic wastes.

The current invention develops and maintains unnaturally large populations of aerobic or anaerobic microorganisms which feed on organic material. By siphoning gases from around the pile, into a pile of materials containing some organic material, processing of organic material is accelerated. The siphoning of gases into the pile is done by means of adding liquid to a pile of materials and providing an opportunity for the gravity flow of liquid through the pile to pull oxygen or other gas into the pile. The liquid is collected in drainage media and removed.

The inventions attributes include:
low capital and operating costs
efficient
protective of the environment
flexible with regards to feedstock variations
highly scalable
energy efficient and compatible with alternative energy sources
sustainable

DETAILED DESCRIPTION OF THE INVENTION

Anoxic or anaerobic are used interchangeably and imply the there is a condition that there is insufficient oxygen to support aerobic organisms.

A Passive Digester is the utilization of the current invention, Passive Digestion. A Passive Digester is a pile containing some organic material. A landfill can also be a Passive Digester and is a pile containing some organic material.

Conventional prior art does not include Transformer or Accelerated Processing.

The current invention and the conditions it overcomes are impossible to observe

Humus is what is left behind after organic materials are stripped of the available energy by microorganisms. When tested by compost laboratories it is defined as a very stable compost that will not reheat. At the end of digestion, the vast majority of the energy in the original organic material has been used, the humus material has a large water capacity, and it is a valuable soil amendment.

The liquid or pumpable wastes used or treated by the invention include, but are not limited to clean water, brackish water, sludge, leachate, contaminated groundwater, contaminated surface water, sewage, stormwater, liquid industrial waste, process water, spoiled liquid products and mine drainage. The term definitions include, but are not limited to: Industrial waste—Waste both liquid and solid that are not hazardous waste and produced in an industrial setting. Grey water—Liquid waste from homes and restaurants that does not include human waste. Sewage—Liquid waste that contains human waste. Process water—Water that is used in a process and contaminated such that it cannot be released into the environment without effecting the environment. Mine drainage—Liquid that is contaminated due to contact with materials in a mining environment. Leachate—Water that has come in contact with materials and has "leached" portions of said materials into solution. In addition to hydrogen peroxide, other oxygen releasing compounds that may be utilized provide aerobic conditions include magnesium peroxide, permanganates, calcium peroxide, and other similar compounds.

Liquid introduction options of the current invention include surface excavations in the pile, slotted or perforated tubes positioned in the pile, or pockets of permeable materials in the pile to facilitate the contact between the pile and liquid or liquid-solid mixture.

This invention facilitates the cost-effective treatment of liquid, hazardous, and solid waste in a landfill or composting site or any other pile. The ability to distribute gas to the waste, facilitate processing by microorganism, and remove heat and spent waste are the focal points of the process. This invention can digest any size landfill or treat any size pile containing some organic material. Pile moisture content is increased, eliminating fires. Processing halts the production of high-strength greenhouse gases and odors.

Maintaining the carried organisms in the liquid that will be added to the pile is beneficial but is not a requirement. The organisms and therefore their characteristic survive in the pile.

Degradable organic materials would include any organic materials in general, such as sludge, yard waste, the organic portion of MSW, as well as the degradable contaminants found in soils and groundwater.

The description of the current invention is based on a pile of material which contains some organic matter. The pile could be all organic matter or could be a small percentage organic matter. A pile of aggregate with some petroleum in it could serve as Passive Digestion. A pile made up completely of yard waste could also be a Passive Digester. There are infinite possibilities regarding the pile and the liquid that is added to the pile. Liquid can be added in any form or concentration. Liquids can range from clean water to sludges with a far lower liquid content. The flow of the liquid through the pile provides the movement of gas and liquid through the pile. This flow provides the opportunity to achieve processing capabilities that are not found in nature. The pile is isolated by drainage and provides any opportunity for unnatural control. Passive Digestion uses gravity and manipulation of pile characteristics to achieve results. The current invention provides superior results at lower costs and processes a wide variety of feedstock. The feedstock of the Transformer and Accelerated Processing are acceptable for Passive Digestion.

The pumping gases into a pile containing some organic matter, per prior art often resulted in fires because of the preferential flow of oxygen and the heat that produced causes combustion. By using liquid to move gases there is minimal opportunity for combustion and maximum opportunity for heat dissipation and processing maximization. The movement of water and gas through the pile creates the opportunity for improved biological processes. The addition of liquid is used to induce the flow of the atmosphere from around the pile, through the pile. The formation of biofilm on the material found within the pile and the subsequent flush of liquid over that biofilm provides an optimal environment for microorganism population and processing capability. The use of the current invention as a contaminated water treatment apparatus is also available.

Adding liquid that is aerated or in the anaerobic case, isolated from oxygen can be advantageous but is not necessary. The pile retains enough organisms to provide a treatment of the materials through the movement of gas through the pores of the pile. Obviously higher populations of microorganisms being moved through the pile increases the processing capability of the pile. That is not necessary but provides additional treatment capability. This is being taught in the specification but is not part of the claims as it would reduce the scope of the current invention. The movement or flow of water, due to gravity, through the pile brings water and nutrients to the voids in the pile. The water leaves the void with processed materials, heat, excess nutrient and microorganisms. Microorganisms in the void are left with new resources.

In the anaerobic state, the isolation of the added liquid from oxygen provides the best results. In the aerobics state the spraying of liquids can provide optimal results if the associated evaporation of liquid is not an issue. Liquid that is super-saturated with oxygen and contains a maximum number of aerobic organisms would likely be the best mode operation. Again, this invention does not claim that as being necessary as it isn't. The current invention includes the spraying, the flooding, or any other method of adding liquid to the pile. The addition of too much liquid is a detriment to the biological process as the flow of liquid and the movement of gases provides optimal performance. If the pores in the pile are never allowed to drain it becomes similar to a submerged system that loses capability accordingly.

Passive Digestion is suited for the processing of a landfill, the processing of source separated organics and everything in between. The ability to move gas, liquids, nutrients, etc. through the pile offers processing capabilities that are not found in prior art.

Passive Digestion consists of adding liquids and solids to a pile that contains some organic matter. The use of drainage and gravity provides the flow of gas, liquid, and or solids through the pile. In the case of anaerobic state, the induced flow competes with the natural tendency of anaerobic organisms to restrict flow. In the case of aerobic processing, the movement of gas liquid or solid through the pile pulls oxygen into the pile and provides the opportunity for microorganisms to thrive in a manner not found in nature or in the conventional prior art.

The pile provides the opportunity for incubating and maintaining the microorganisms. The microorganisms provide the value of the current invention. The environment in the pile can support an increase population of microorganisms because of the availability of energy, liquids, nutrients, dissipation of heat, and many other characteristics that control the maximum population of microorganisms. The current invention offers the opportunity to add microorganisms, nutrients, and whatever other materials are advantageous.

The current invention provides the opportunity to manipulate of the characteristics of the microorganisms in the pile, the contained solids, the contained liquids, the extracted solids, the liquids removed from the pile, and the gases or any other materials associated with the pile. Once the pile is as large as desired, material can be removed and new material added. A full pile that is volumetrically matched to incoming feedstock is desirable and efficient. Pile size should be sized to fit the maximum volume needed. Material that the pile is built of or is added to the pile can be removed after the energy contained in the feedstock is completely exhausted or any time after it is added. It may be advantageous to remove the material from the pile, for use elsewhere, when the microorganism population is at its peak. Materials can be removed from the pile anytime from peak microorganism population to minimum microorganism population, depending upon the needs and interests of the operator. These characteristics can be monitored to optimize the usefulness of the invention.

The maximum microorganism population of the pile is greater than that of a liquid holding vessel such as a lagoon. Piles of raw organic solids contain a lot of energy. The availability of energy dictates population of microorganisms. The removal of other constraints to exponential growth provide a maximum population opportunity. Prior art does not utilize the opportunities of the pile and gravity flow through the pile which moves solid liquids and gases through the pile. A pile that is immersed in liquid does not have the capability of achieving the capabilities of the current invention. A pile, that has continuous flow of liquid through it, that is immersed in liquid, does not have the capabilities of the current invention. The flow of liquids through soils does not offer the capabilities of the current invention.

Treatment of resistant contaminants such as chlorinated solvents and pesticides through sequential exposure to aerobic and anaerobic environments is a feature of Passive Digestion, as it is for Accelerated Processing. Starvation treatment of feedstock, particularly when toxic compounds exist in the feedstock, can be utilized with Passive Digestion. The use of higher energy feedstock to optimize the population within the pile and then allow that population to process the lower energy toxic compounds as the microorganisms starve to death is referred to as starvation processing.

Within the population of microorganisms within the pile there are organisms that are resistant to the toxic effect of the feedstock. As the available energy of the pile and liquid is reduced, the organism that can extract energy from the toxic compounds become more dominant in the pile. This provides for optimal treatment of the toxic compound as well as the opportunity for optimal quality of the product material, as well as optimal speed of processing of the persistent, toxic, or otherwise difficult to treat materials. The ability to treat difficult to treat materials offers the opportunity for increased revenue for the operator of the digestion system.

The monitoring of the characteristics of the pile or the liquids or solids added to the pile, offers the opportunity to adjust the current invention for maximum treatment capability.

One of the major constraints to microorganism population growth is the heat generated by the large population of microorganisms produced by the current invention. As the microorganisms process the almost unlimited food supply found in the material within the pile the microorganism consumes the energy available in the feedstock and converts it to heat. The invention supplies energy, water, nutrients and the microorganism. If the heat is not dissipated, the biological process becomes compromised and the microorganism population cannot be maintained at optimal levels. After heat, all characteristics of the pile become relevant regarding the maximum population achievable in the pile and in the liquids. The heat produced by the microorganisms can be utilized to optimize the performance of the system in cold climates. The heat can be used for the conditioning of water containment such as lagoons or to condition incoming feedstock to maximize the capabilities of the current invention. Heat can be collected and used elsewhere.

The use of Passive Digestion at facilities that were built for conventional anaerobic digestion or windrow composting is cost-effective. Many of the same components that are used in Passive Digestion are available at these facilities that utilize the prior art. The savings experienced by the transition to the current invention are often almost instantaneously greater than the cost of the modifications required.

Passive Digestion can be either anaerobic or aerobic. With an effective pile and sufficient drainage, it's possible to overcome the characteristics of anaerobic organisms through Passive Digestion. Anaerobic organisms impede the flow of liquids through materials. Passive digestion is designed to overcome at least some of the resistance to flow provided by anaerobic organisms. The increase flow provides increased microorganism populations. Increase population provides additional processing capabilities. The flow of liquids and whatever the liquid carries through the pile, provides the opportunity for the anaerobic organisms to process additional materials and create additional gases in less time. The value of the gas, collected from the pile surface or out of the drainage media, provides added benefit to the system. Passive Digestion can include any number of transitions between anaerobic and aerobic conditions to increase efficiency, optimize processing capability, increase flexibility of feedstock, and manipulate characteristics of the product the invention.

In the anaerobic state the current invention can produce larger quantities of gas than the conventional anaerobic digestion found in the prior art. Increased flexibility of feedstock characteristics in both the anaerobic and aerobic states also provides an advantage over the conventional prior art. The combination of anaerobic and aerobic treatments within the same pile and multiple sequences of these transitions offers flexibility with regards to feedstock and product. The quality of the product is influenced by the combined characteristics of the processing. Products such as compost tea can be manipulated to achieve the characteristics desired for an infinite number of different applications of the product. The current invention offers the opportunity to produce small or very large (millions of gallons or millions of yards) of consistent and controlled products. There are no other systems in the conventional prior art that have these capabilities. The current inventions capability to extract additional energy for the production of gas is a major attribute and a significant improvement over the conventional prior art.

The drainage of the pile is based on gravity and so is the collection of methane. Methane is lighter than air and the collection of this gas is based on gravity. The anaerobic state of Passive Digestion is designed to optimize the production of methane, from an expanded feedstock, when compared with conventional prior art. A sealed sump offers the opportunity to collect methane with minimal difficulty. The collection of methane at the high end of the drainage and collection of anaerobic liquids at the low end is an effective use of the current invention. This system also provides effective processing capabilities in the aerobic state. It may be an advantage to process the materials coining into the digester pile anaerobically and then complete the process of stripping the energy from the feedstock with the aerobic phase. The value of the methane is usually defined by the availability of a user for the combustible gas. In the context of the current invention, the term extraction and drainage are the same thing. Both are associated with gravity flow. When liquids are accumulated in a sump they may be pumped from the sump but the flow in the pile is not directly induced by power, such as an electric pump.

Passive Digestion forces flow in and out and through the solids pile with gravity. Increasing internal flow increases the ability to process materials. The current invention relies on gravity after the liquid is applied. Accelerated Processing uses external energy for pumps, vacuum, and other methods or devices to force the flow liquids and gas. Passive Digestion forces anaerobic liquid and gas through anaerobic solids while maintaining the anaerobic organisms in the pile. Changing the pile between anaerobic and aerobic requires changing the gases around the pile. Anaerobic conditions are a more difficult application of the current invention but a still possible. Anaerobic organism impede flow and increase the requirements regarding the filling and drainage of the pile.

Liquid, sludge, slurry, addition to the pile can be pumping it onto, pouring, spraying, spreading, smearing, adding it to aggregate, pipes, drainage beds, basins, holes or use any other way that is available for getting the liquid into the pile, with the exception of pressurized injection.

Subtitle D landfills can be used for processing the landfilled material with the current invention. The landfill cell is the pile. The landfill contains the majority of the components necessary to utilize the invention. The availability of a liner is not necessary. Passive Digestion can have a liner or not. The availability of drainage dictates the effectiveness of the system. Some feedstock materials are better for drainage. Combinations of highly permeable material with materials with less permeability furnishes a wide array of feedstocks that work effectively. The emptying and filling of the pore structure of the pile pulls gases from around the pile, such as normal air, through the pile and offers the opportunity for populations of microorganisms to thrive. The flow of liquid through the pile moves heat, nutrients, and digested material such that additional organic material is exposed to processing. The constraints to optimize biological processing are minimized. Use of the entire underside of the pile as a drainage media, with addition drainage media within the pile, provides the widest array of feedstocks processing capability.

Feedstock for Passive Digestion can be virtually any organic material. The pile can be made up of virtually anything and some organic material to be processed. A pile of aggregate with petroleum or other organic material inside it could be used for Passive Digestion. The petroleum/organics can be digested, and the aggregate reused. Liquid going through the pile offers the opportunity for the biological degradation of the materials. The current invention is a pile of material containing some organic matter. The pile could contain any amount of organic matter when it's built and have additional organic matter added in, in the form of a solid, a mixture such as MSW, liquid, slurry, and or sludge. By pulling gas through the pile with liquids and gravity drainage this system is Passive Digestion. The concentrations of the organics in the feedstock can vary from a small amount to 100%.

Feedstocks available for the current invention include and are not limited to MSW, sludge, organic materials (plants, animals, human waste, etc.), liquid—solid mixtures, slurries, industrial wastes, animal waste, hazardous wastes, contaminated materials, any type of organic waste, residue, or material.

The planned addition or treatment of large organic contributors such as manure, greenwaste, sewage, sludge, and foodwaste can be utilized to optimize the soil enhancement value of the resultant solids and liquids. The solid and liquid treatment furnished by the invention offer many advantages over the existing systems. Nutrients are stabilized or preserved in forms that are available to recipient plants. High strength wastes, such as manure or sludge are buffered, but much of the nutrients the materials originally contain are preserved. Odors, undesirable plant and insect reproductive media, and pathogens can be destroyed or minimized. Chemical and pH adjustment with additives from industrial or agricultural waste can enhance the value of both liquids and solids. Materials that are not waste such as sugars, lime, acid, or oils can also be utilized to manipulate biological results. The end products of Passive Digestion can be tailored to the needs of the recipient site. The volume available for mixing and buffering is a major advantage when comparing this invention with existing systems.

Facilities utilizing this invention feature liquids and solids that can be utilized for pH control used for acid materials treatment (such as mine waste) and metal stabilization. Beneficial materials like tea and humus are furnished that supply micronutrients, nitrogen, phosphorus, metals, and/or beneficial bacteria. Bacteria furnish disease resistance/inoculants, insect control, antifungal characteristics, and general pathogen control.

Piles that have high percentages of materials that are impermeable in the feedstock require care. Materials that block the flow of liquid provide a challenge for processing. Large quantities of asphalt shingles, which do not readily degrade and have a tendency to bind themselves together, block flow of everything. This are a great example of materials which are problematic. MSW is an acceptable feedstock but the more plastic film and any other material that impedes flow in the pile will require more and better drainage. Materials such as clay can be a problem if they are concentrated in an area in the pile. The current invention offers the opportunity to "mine" the landfill by processing the organics for easy separation from the plastic, metal, and glass of the digested material. Digesting the MSW in the landfill with the current invention for the benefit of avoiding high strength greenhouse gas production, minimizing leachate cost, extending landfill life (volume reduction associated with digestion of organics in MSW), and reduced post closure liability is financially lucrative even if the digested material is left in the landfill.

The development of exponential growth offers benefits regarding processing capabilities and the production of microorganisms that can be used in other piles, sites, facilities, and applications. The capability of Passive Digestion to produce compost tea is part of the current invention. Compost tea is liquid that has microorganisms, nutrients, or any number of beneficial compounds typically used for surface application on living plants. The value of the processed organic material and the liquids drained from the pile are significant. Passive digestion offers the opportunity to produce microorganisms that are superior to those found in nature or in other systems such as wastewater processing systems. Passive Digestion offers multiple opportunities to increase the efficiency and effectiveness of wastewater treatment plant operations. Passive Digestion has numerous capabilities that are applicable to remediation and cleanup operations.

Seeding, as described in the Accelerated Processing specification, is can be done with Passive Digestion by distributing the liquid and solids from the pile. Organisms are harvested, manipulated if needed, and utilized in situ or ex situ/in one of more locations, characterizing a major improvement of existing technology. Movement of the organism is critical to effectiveness; dead organisms are of little value. The anaerobic portion of the invention provides a synergistic improvement in overall treatment capability, producing more degradation in toxic material, in less time. Treatment capabilities are expanded exponentially; environmental protection and remediation capabilities of our civilization are significantly expanded.

Seeding of a liquid or solid treatment area with the appropriate daughter contaminants can furnish optimum bacteria at the optimum moment. Liquids or solids that have been processed by bacteria that have been driven to brink of starvation are exceptionally effective at degrading the next dose of contaminant in the same isolation.

The current invention does not require a liner but can use a liner on its bottom, sides, or top. The availability of lower permeability material underneath drainage material will increase the drainage capabilities of the current invention. Avoiding excessive concentrations of lower permeability material in the pile is important to the operating capabilities of the current invention. The pile can effectively deal with large quantities of difficult to process materials, based on flow characteristics, if the materials are mixed effectively. The pile can be designed to have areas that have greater drainage opportunity at various points. The pile can be designed to provide optimized areas of liquid infiltration such that preferential placement of material in the pile provides the results expected of the current invention. Drainage materials can be added to offset low permeability feedstock.

The use of a liner can be beneficial from an operational standpoint but for the most part is dictated by a regulatory perspective. The feedstock and the local regulations will probably define if a liner is necessary. Operationally a liner can be insignificant. Liners do provide flexibility in building of digesters. Obviously, Subtitle D landfill facilities that are being processed with the current invention would have a liner and leachate collection systems that meet regulatory requirements. Additional drainage and placement of material to enhance internal flow provide improved results and speed of processing. Liners under the pile and on the side of the pile can be used to increase and manipulate flow. Liners on top the pile control precipitation, evaporation, odors, and can be used to maintain an oxygen limited atmosphere.

Drainage media can consist of virtually any material. Non-woven geotextiles, geonets, pipe, and aggregate are just a few of the possibilities. Avoiding clogging of the material and easy cleaning or replacement makes sand a cheap and effective drainage media. Using non-woven geotextiles to protect the drainage media from clogging offers opportunities.

The use of clay or other low permeability materials to improve collection or drainage capabilities can be a part of the current invention. Clay underneath a collection pipe is not a liner system but offers the opportunity to direct the flow of liquid to the drainage media. Drainage media can consist of a wide array of materials. The drainage plan or design can include the use of dissimilar materials to direct flow. This allows the use of lower-cost materials to achieve acceptable results. The depth of the pile can also be manipulated to achieve the desired level of flow through the pile. Material that has been partially degraded experiences a change in the ability to transmit liquids and gases through it. Modifications of the pile thickness and feedstock may be advantageous under a number of circumstances. The addition of highly permeable feedstock or material may be advantageous. The addition of highly permeable inert material may be necessary to process problematic feedstocks and achieve the optimum performance of passive digestion.

The application of liquids and liquid containing mixtures offers many possibilities from aerial spraying to sheet flow over the surface of the pile. The application of materials which contain liquids, but in low concentrations, provide opportunities for mixing the material such as sludges in be pile as it's built. Sludge can be spread, poured, or applied in any manner. Pumping liquids or liquid containing mixtures onto the pile is the most practical way of providing flow through the pile. Any opportunity to cause flow of liquids and siphoning of gas through the pile would be an application of this technology and invention.

The movement of liquids, nutrients and materials through the pile provides an improved environment for biological processing. While the use of powered systems to pull or push liquid through the pile would be an optimal application that would infringe upon the intellectual property associated with Accelerated Processing. The current invention uses gravity and drainage to move liquids and therefore nutrients, gases, and solids through the pile. The movement of solids and the harvesting of the digested material from the pile provides the opportunity for new material to be put in to the pile and maintain a systematic cycle which is highly efficient at utilizing the minimal amount of space to process the maximum amount of material.

The use of Passive Digestion minimizes the costs and complexity of the processing system. The use of lagoons to provide liquids for the continuous input of large populations or selectively bred microorganism will be a best mode option. Cycling liquid and organisms that have been removed from the pile back into the pile increases the efficiency of the invention but is not required. The pile itself retains enough biology to maintain the process. The pile offers and opportunity for the optimization of the microbes. The best mode application of the current invention maximizes microorganism population, evolution, and processing capability. Processing capability optimization is largely based on the available microorganism population. Optimization calls for continuous and consistent conditions throughout the process, the cycling of liquids into and out of the pile, and the opportunity for the microorganisms to evolve throughout the entire process. The claims that do not require a continuous optimization that is taught here are the broadest application of this technology and are the foundation of this invention. The use of the flow of liquids to siphon gas through the pile is the broad application of the invention. There are an infinite number of additional modifications that can be attached to the current invention.

This invention controls the gravity flow of liquids and liquid containing mixtures through solids. The ability to produce an improved microorganism, while increasing or maintaining microorganism populations improves processing. "Controlling performance of evolved organism in the optimized environment of the pile" can be used is a description of what a person skilled in the art can accomplish through the use of this invention. The specification of current invention clearly states the inventive step and goes to great lengths to describe the best mode utilization of the invention in various situations. Cycling of microorganisms through the solids with gravity is an application of the technology. Cycling is not necessary as the biological identity of the digester is maintained with or without reintroduction of the microorganisms that came out of the pile. The manipulation of the microorganisms is possible and effective with the Passive Digestion invention. In many circumstances the minimized expenditures and simplicity of Passive Digestion will be its most important attribute.

The use of a reservoir and the cycling of organisms through the pile and the reservoir while maintaining optimal conditions is an optimal utilization of Passive Digestion but it's not necessary. Continuous flow and movement of gases and liquids through the pile offers a best mode but is not necessary to achieve a functioning system. The practice may or may not be cost effective.

The majority of the solid waste produced in the United States is acceptable as feedstock for the current invention. The current invention offers the opportunity to take the solid waste and process it such that it is far more easy and cost-effective to recover recyclables such as plastic, glass, and metal. The current invention offers the opportunity to divert the vast majority of the organic materials found in solid waste from landfills in a cost-effective manner. The current invention offers the opportunity to return the organic resources found in solid waste, yard waste, and other currently discarded materials to the soil resources of local communities.

Best mode operation of the current invention features a highly permeable feedstock and the operator being richly compensated for disposal of the material. The liquids added are high in energy and the operator is richly compensated for disposal of the liquid. The best mode Passive Digestion pile is connected to one or more lagoons which provide continuous availability of liquids that have significant populations of organisms that are manipulated for best mode performance within the pile that makes up Passive Digestion. The liquid is kept at the same conditions that are found within the pile while it is in the lagoon and being transferred to the pile to optimize the characteristics of the organism that is in the liquid and in the pile. Liquid is added to optimize the microorganism population within the pile and facilitate the maximum population and optimal evolution of the organisms.

The pile itself is contained on the sides and bottom with an inexpensive but dependable liner that is impermeable and the entire liner surface features high permeability drainage media that maximizes the flow of liquids through the pile and out of the pile to a collection point. The gas pulled through the pile or created in the pile is maximized with regards to quality or volume or both, by the optimal drainage material. The systematic and sequential addition and removal of liquids and solids to the pile and the characteristics of the pile itself are monitored and adjusted to meet the operator's needs and maximize income. Characteristics of the pile itself include but are not limited to pore space, nutrient value, energy value, permeability, and any other characteristics that influence the flow of liquid and the population of microorganisms within the pile. Making the best use of gravity is the primary way of optimizing the utilization and best mode operation of the current invention. The pile is constructed to minimize the negative effects of restrictions in the feedstock and maximize liquid flow and gas movement. Pile construction also maximizes liquid infiltration and minimizes liquid application cost. The products of the current invention are liquids and solids that are very valuable in the local market. The operator is compensated for greenhouse gases avoided and or produced. Green energy is provided to adjacent businesses and the operator is compensated for it.

The current invention will provide the opportunity for cost-effective, sustainable, circular systems which minimize logistical costs and the associated ecological expense. The ability to extract energy from waste locally, based on low cost systems, offers the opportunity to provide systems that have a net energy surplus. The solar energy is absorbed by plants, and the rest of the system uses less energy than is provided by the Sun and the gas provided by the current invention. Nutrients and humus are returned to the plants that gather the solar energy. This provides the opportunity for sustainable existence during the life of the current solar system configuration. To provide a sustainable system such that interplanetary travel is possible, based in part, on the efficiency of the ecological support system provided by the current invention is possible.

The Transformer and Accelerated Processing are prior art, and both referenced in this specification multiple times. Their feedstocks are very similar to that of the current invention. All three inventions are related but unique. The capabilities and utilization of microorganisms of these three inventions is different than the prior art.

The novelty of the current invention is the ability to change the characteristics of microorganisms and put them to use for the benefit of the operator. Passive Digestion is not obvious as the characteristics found in a pile of materials are difficult to see and even harder to understand. Conditions within the pile that are not manipulated per the current invention are ecologically dangerous and in most cases toxic to humans. To observe the characteristics of the natural situation requires destroying the environment that exists under normal conditions. Passive Digestion changes the characteristics that are hidden within the pile and provides an improved environment for the microorganisms to process organic materials. The processing of organic materials at minimal cost is very valuable. Providing an incubator for microorganisms that will then be moved to another site offers flexibility and processing capabilities.

Passive Digestion offers the opportunity to maintain a biological identity that is far more energetic and effective than those found in nature or conventional prior art. The reduced cost and complexity of Passive Digestion offers incentives for the inventions utilization. The current invention maintains exponential growth unlike prior art, with the exception of Accelerated Processing and the Transformer process. While there are many methods that allow microorganisms to achieve exponential growth, the current invention offers a large advantage over the prior art. The ability of the current invention to maintain of exponential population increases at populations that greatly exceed those found in nature or in the prior art illustrates its value. System that are based on submerged applications, system such as membrane bioreactors, cannot maintain or develop the populations that can be achieved in a pile. A pile that achieves the siphoning of gas into the pile and provides the opportunity for microorganisms to achieve populations and treatment capability that are far greater than those found in the prior art. The exact numerical value of the population density depends upon the characteristics, including energy content of the feedstock. Passive Digestion, Accelerated Processing, and the Transformer all achieve different levels of maximum supported microbial populations. Each invention offers a different maximum. Each of these inventions offers a maximum microorganism population that is far greater than those found in nature and in the prior art.

The current invention is not:
A standard conventional anaerobic digester in a tank
A standard submerged membrane bioreactor
Any kind of submerged treatment system
A static pile, forced air type composting system
A windrow composting operation where the materials are turned to add air Prior art anaerobic digesters rely on a very selective feedstock that has small particle size and is easily processed based on the characteristics of the standard anaerobic organism. The limited processing capability associated with prior art anaerobic digesters severely limits the types of feedstocks and the quality and value of the product produced. The current invention, when operated in the anaerobic mode, requires minimal size reduction and far less capital expenditures to provide an operating system. The current invention offers flexibility and cost savings that aren't found in the prior art. The current invention has a small footprint and a large processing capacity. The biological loading of the pile of solids is far greater than the biological loading of a conventional anaerobic processing system that relies on a small particle slurry to be fed into it.

Figure 1:
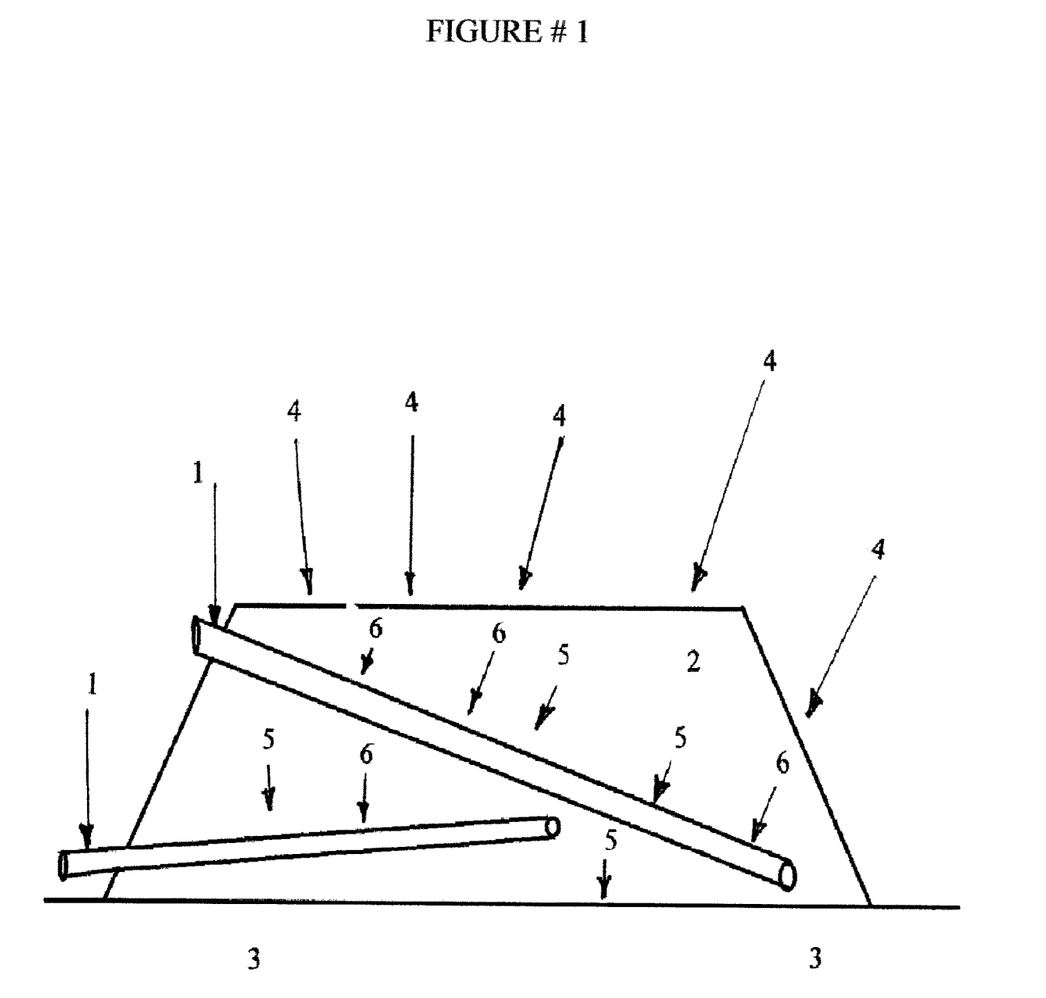
FIG. 1 Organics Pile Cross Section, Drainage Pipe Lengths
FIG. 2 Landfill Cell, Cross-Section and Pipes
FIG. 3 Organics Pile, Processing Cycle Illustration
FIG. 4 Organics Pile Cross Section, Infiltration Contours and Sumps
FIG. 5 Landfill Cell Cross-Section, Intermediate Drainage
FIG. 6 Organics Pile Cross Section, No Liner
FIG. 7 Organics Pile Cross Section, Use of Slope
FIG. 8 Organics Pile Cross Section, Large Surface Area Pile on a Slope

FIG. 1 Organics Pile Cross Section, Drainage Pipe Lengths

FIG. 1 is cross section of a source separated organics pile. Sloped drainage pipes that intercept liquids are illustrated. Piping can be installed horizontally, vertically, and in both horizontal axes of the pile. The amount of drainage required is dictated by the characteristics of the feedstock and the characteristics of the added liquids. Liquid infiltration occurs on the top and on the sides of the pile. The majority of the liquid enters the pile (#2) through the top of the pile. The majority of the gases drawn into the pile (#2) also enters from the top of the pile. The surfaces on the sides of the pile (#2) also contribute to the movement of gases through the pile.

Figure Detail by Number Reference
1. Drainage media—any type
2. Pile of material
3. Subgrade
4. Liquid addition (typical)—any type—mist, wet, spray, soak, flood, drench, etc.
5. Gas flow (typical)
6. Liquid flow (typical)
7. Filling area—solids (typical)
8. Material removal area—solids (typical)

Figure 2:
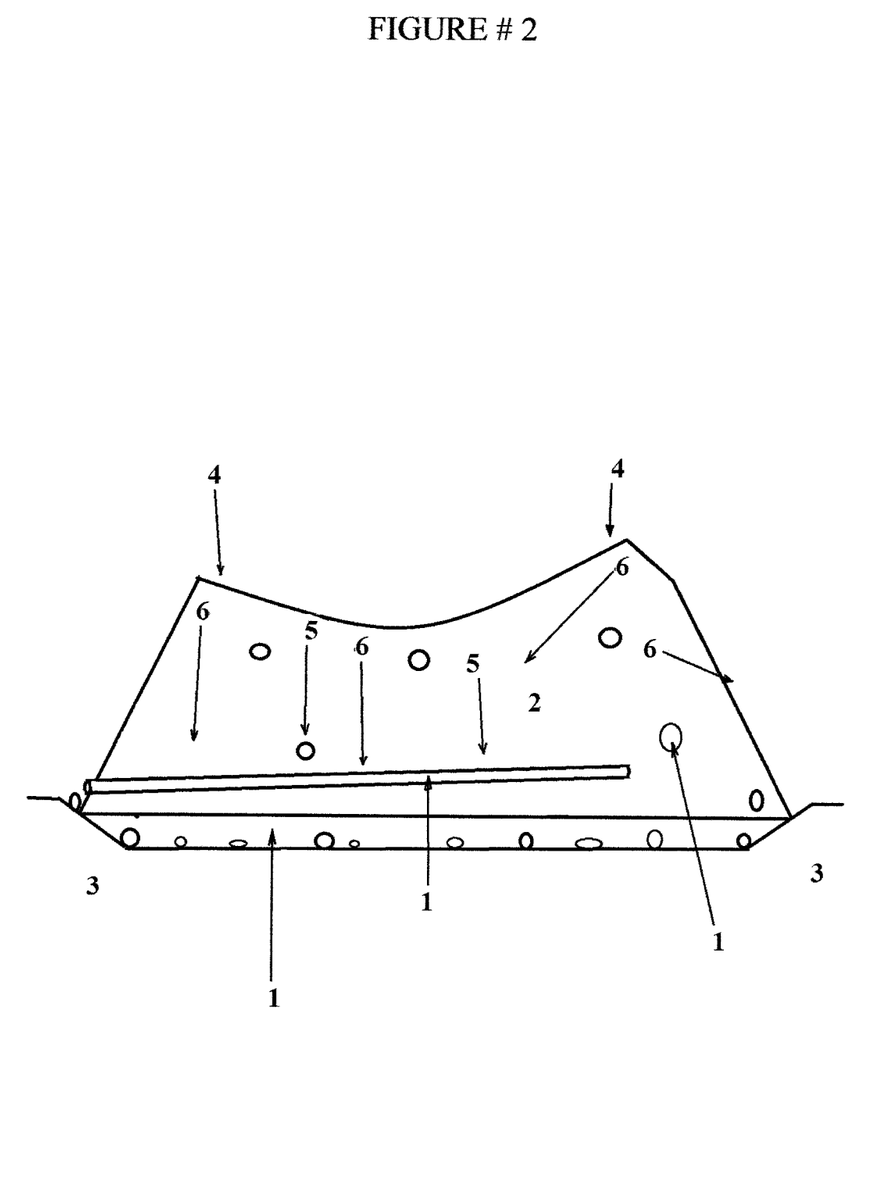

FIG. 2 Landfill Cell, Cross-Section and Pipes

FIG. 2 is a cross-section of a landfill cell. Drainage pipes are illustrated both perpendicular and parallel to the cross section. The cross section illustrates typical Subtitle D drainage with additional drainage as it would be utilized for the digestion application of the current convention. Note the top of the material in the cell is contoured to provide easy infiltration of liquids that will be used to move gases through the pile. The slope of the top of the pile (#2) provides easy distribution of liquids over a large portion of the pile. As the pile (#2) increases in height, the piping can be extended for optimal digestion performance. The bottom surface of the cell has a continuous drainage layer that facilitates the movement of liquids out of the cell. This extensive drainage offers processing capabilities for wide array of feedstock materials. The better the drainage the less liquid movement is required to achieve the current inventions processing requirements. The piping can be removed from the cell if desired when the digestion of the material is complete. Evaluation of the material for use as daily cover and to define future liability of the site should be done systematically. Reduced Financial assurance can be achieved through documentation of avoided liability.

Figure Detail by Number Reference
1. Drainage media—any type
2. Pile of material
3. Subgrade
4. Liquid addition (typical)—any type—mist, wet, spray, soak, flood, drench, etc.
5. Gas flow (typical)
6. Liquid flow (typical)
7. Filling area—solids (typical)
8. Material removal area—solids (typical)

Figure 3:
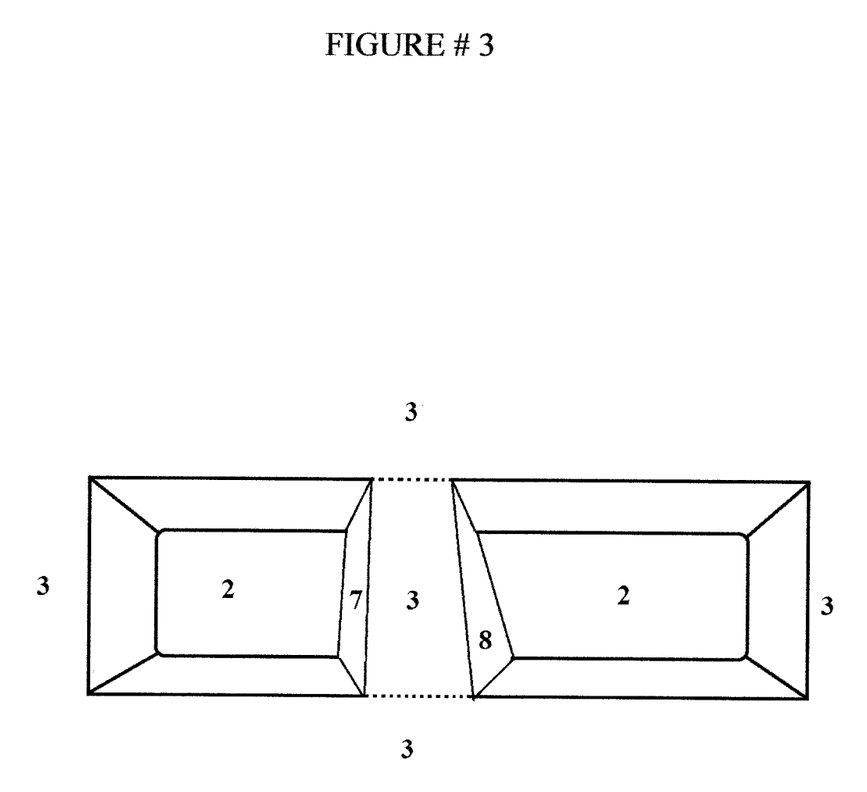

FIG. 3 Organics Pile, Processing Cycle Illustration

FIG. 3 is a top view of an organics digestion processing cycle of a source separated organics pile. The compact footprint of the Passive Digestion is illustrated. Note the gap in the pile. Pile (#2) surface #7 is where the new material is being placed in the Passive Digestion system. Pile surface #8 is the location of the excavation of digested material. The material in surface #8 has been in the pile (#2) the longest and it is ready to be removed. This material has been completely digested and the organics have been stripped of their energy. Material can be removed from the pile (#2) while the energy in the feedstock is partially consumed, if desired. The organic material is now humus and is a valuable soil amendment. Material is being removed from the footprint continuously from surface number 8 and material is being added to surface #7 continuously. This provides a stable system and optimal performance.

Figure Detail by Number Reference
1. Drainage media—any type
2. Pile of material
3. Subgrade
4. Liquid addition (typical)—any type—mist, wet, spray, soak, flood, drench, etc.
5. Gas flow (typical)
6. Liquid flow (typical)
7. Filling area—solids (typical)
8. Material removal area—solids (typical)

Figure 4:
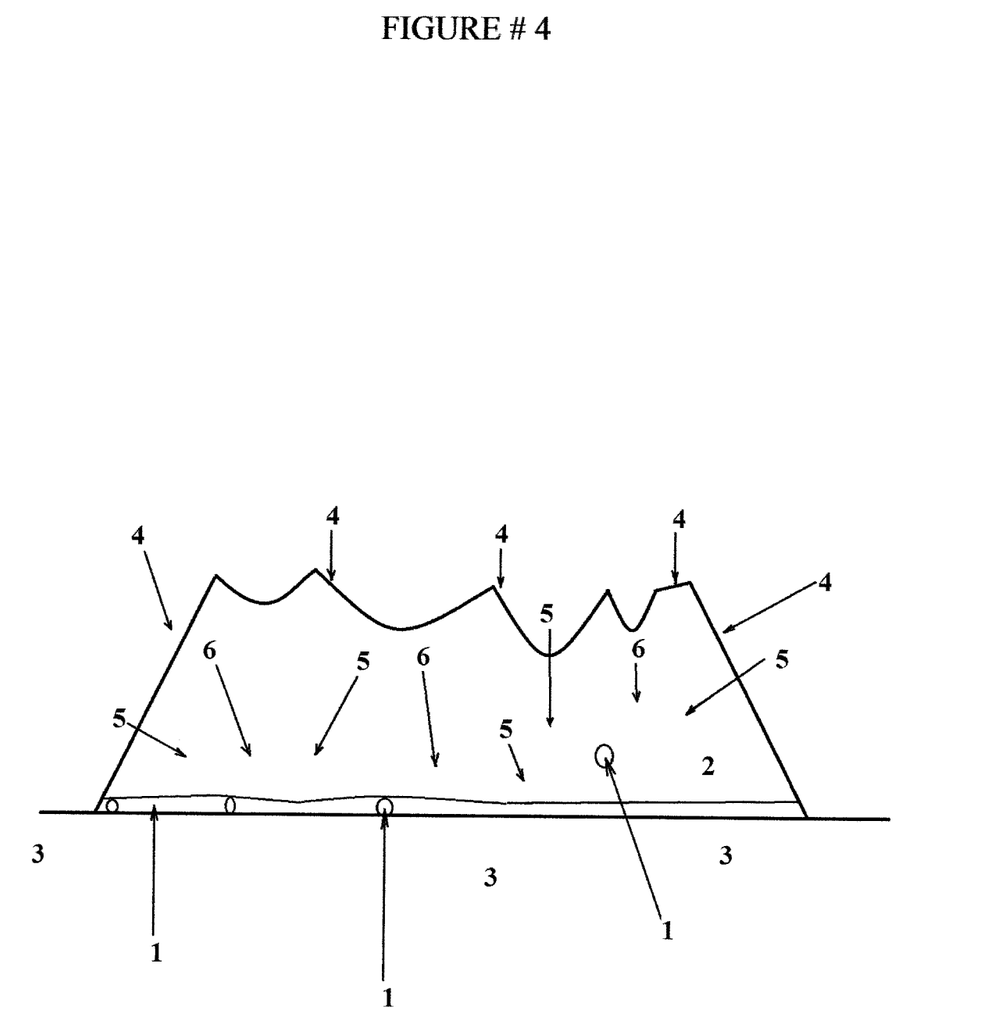

FIG. 4 Organics Pile Cross Section, Infiltration Contours and Sumps

FIG. 4 illustrates a cross section of a pile (#2) with continuous liquid collection #1 at the bottom of the pile. The surface provides excellent distribution of liquids from either spraying or pipe discharge. Spraying can occur on the top and sides of the pile. The arrangement offers excellent infiltration and the opportunity to provide excellent gas transfer from the surface gases. The drainage network at the bottom of the pile, #1 can be covered with a non-woven geotextile or sand. The piping augments the sands drainage capability. Piping and other drainage media can be cleaned as needed to maximize drainage capability. Piping in the feedstock above the drainage layer provides additional drainage capabilities.

Figure Detail by Number Reference
1. Drainage media—any type
2. Pile of material
3. Subgrade
4. Liquid addition (typical)—any type—mist, wet, spray, soak, flood, drench, etc.
5. Gas flow (typical)
6. Liquid flow (typical)
7. Filling area—solids (typical)
8. Material removal area—solids (typical)

Figure 5:
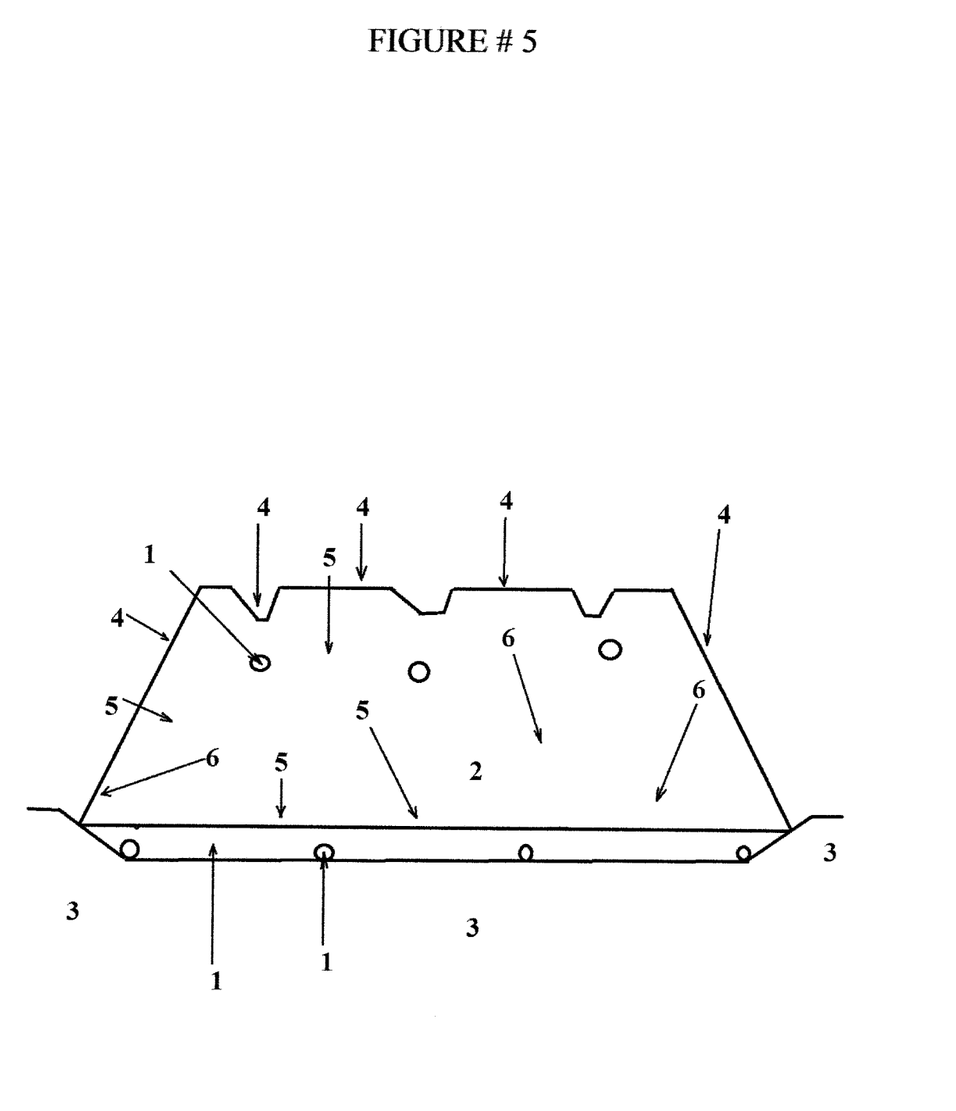

FIG. 5 Landfill Cell Cross-Section, Intermediate Drainage

FIG. 5 illustrates a landfill cell cross section. Note the depressions in the top of the pile. The drainage relatively close to the top of the cell provides the liquid used to digest the material between the top of the cell and the drainage. As the cell height increases, through additional landfilling, the material at the top is digested. Digested MSW is expected to take up approximately half as much volume is undigested MSW. This provides an approximate doubling of the life of the landfill. Additional piping can be added as the material height increases in the cell.

Figure Detail by Number Reference
1. Drainage media—any type
2. Pile of material
3. Subgrade
4. Liquid addition (typical)—any type—mist, wet, spray, soak, flood, drench, etc.
5. Gas flow (typical)
6. Liquid flow (typical)
7. Filling area—solids (typical)
8. Material removal area—solids (typical)

Figure 6:
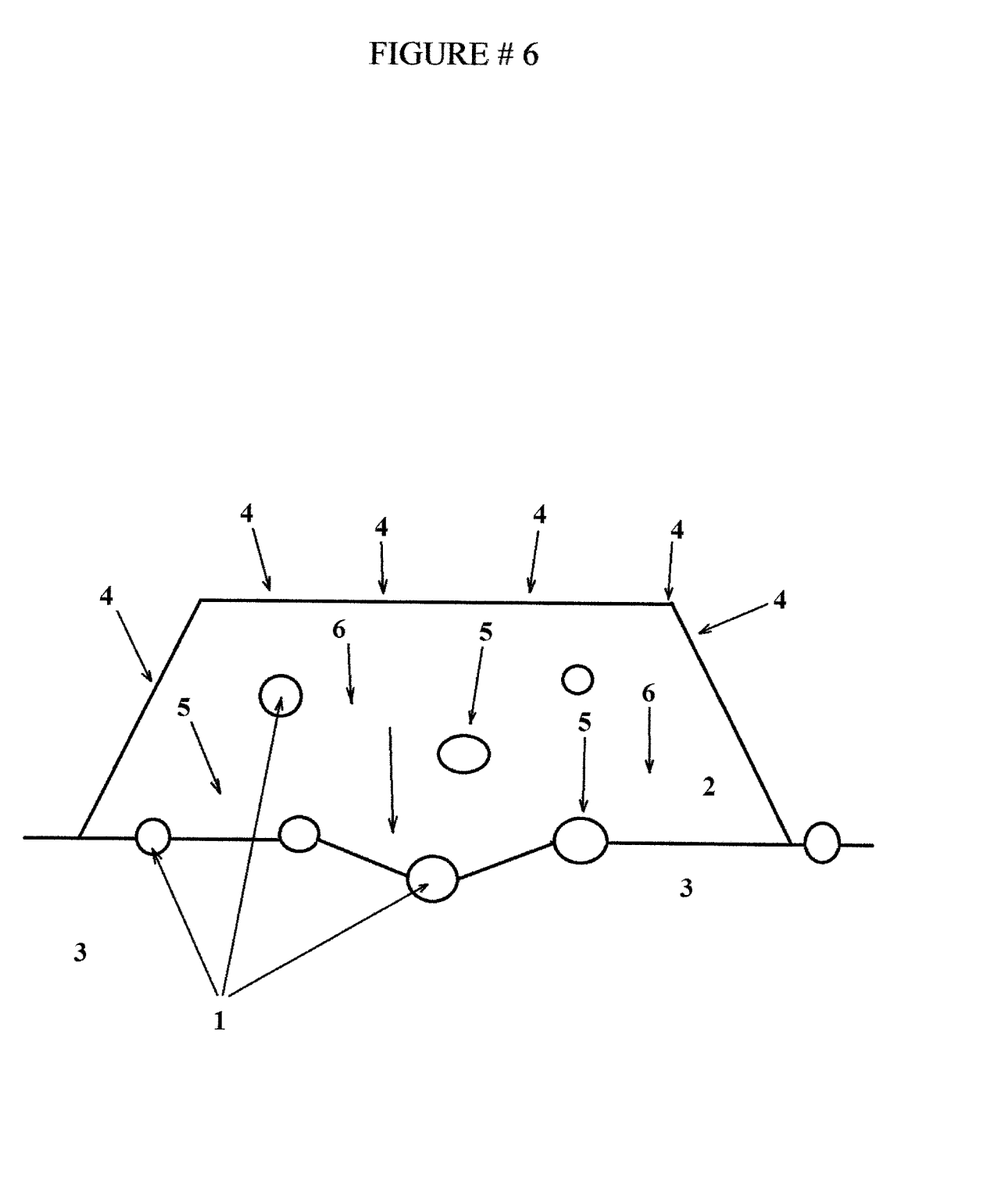

FIG. 6 Organic Pile Cross Section, No Liner

FIG. 6 illustrates a pile (#2) with a sloped subgrade (#3) and no liner. The bottom of the pile (#2) features piping that collects the liquids, as they reach the bottom of the cell. Additional piping (#1) is installed to provide additional drainage. Note the drainage media outside the pile (#2) that is used to catch liquids that are applied to the pile (#2) and run off. The top of the pile (#2) can be flooded until liquids run down the sides of the pile (#2) end contact the subgrade (#3). The top and side surfaces could be sprayed with liquid to provide the force necessary to pull gas into the feedstock.

Figure Detail by Number Reference
1. Drainage media—any type
2. Pile of material
3. Subgrade
4. Liquid addition (typical)—any type—mist, wet, spray, soak, flood, drench, etc.
5. Gas flow (typical)
6. Liquid flow (typical)
7. Filling area—solids (typical)
8. Material removal area—solids (typical)

Figure 7:
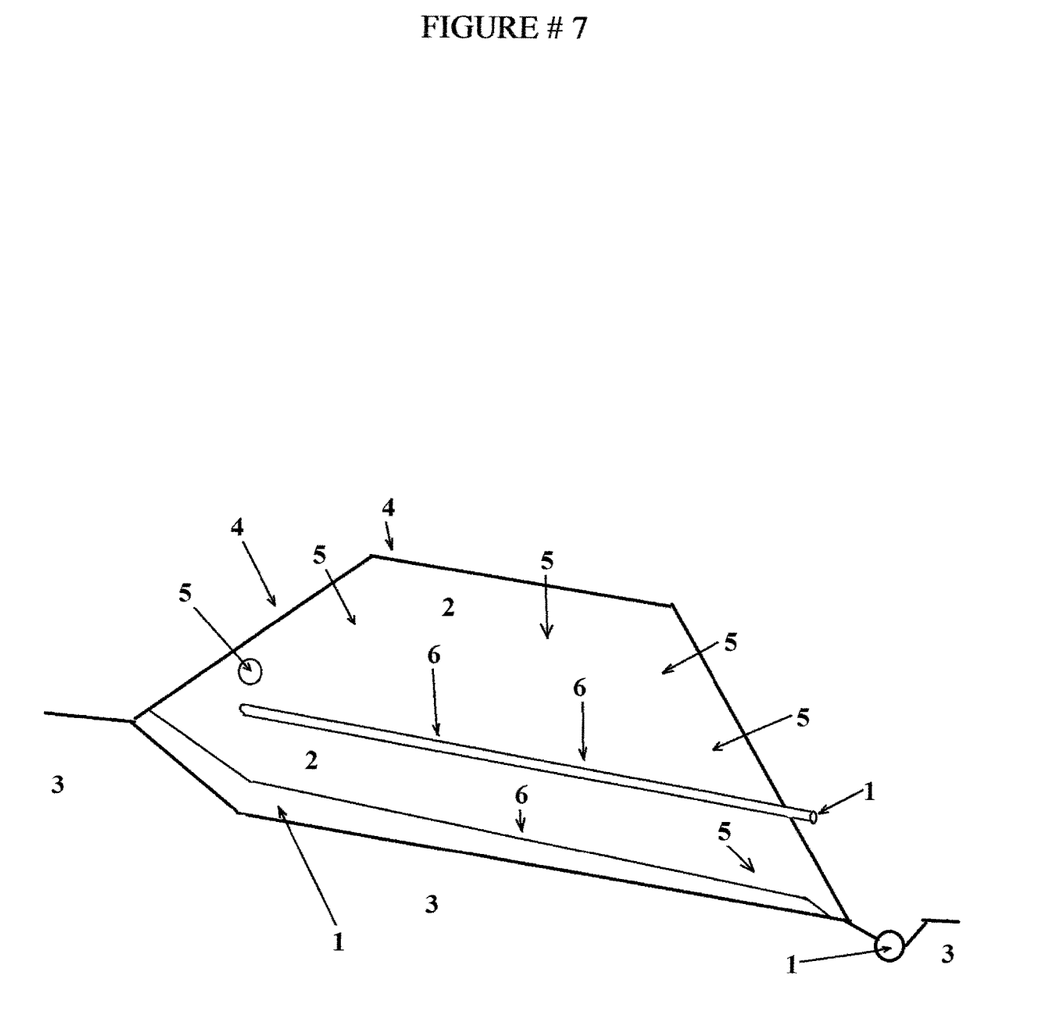

FIG. 7 Organic Pile Cross Section, Use of Slope

FIG. 7 illustrates the use of a slope for maximum drainage and a sump at the base of the slope for collection of drained liquids. As the liquid is applied to the top and gases from around the pile are pulled through the pile.

Figure Detail by Number Reference
1. Drainage media—any type
2. Pile of material
3. Subgrade
4. Liquid addition (typical)—any type—mist, wet, spray, soak, flood, drench, etc.
5. Gas flow (typical)
6. Liquid flow (typical)
7. Filling area—solids (typical)
8. Material removal area—solids (typical)

Figure 8:
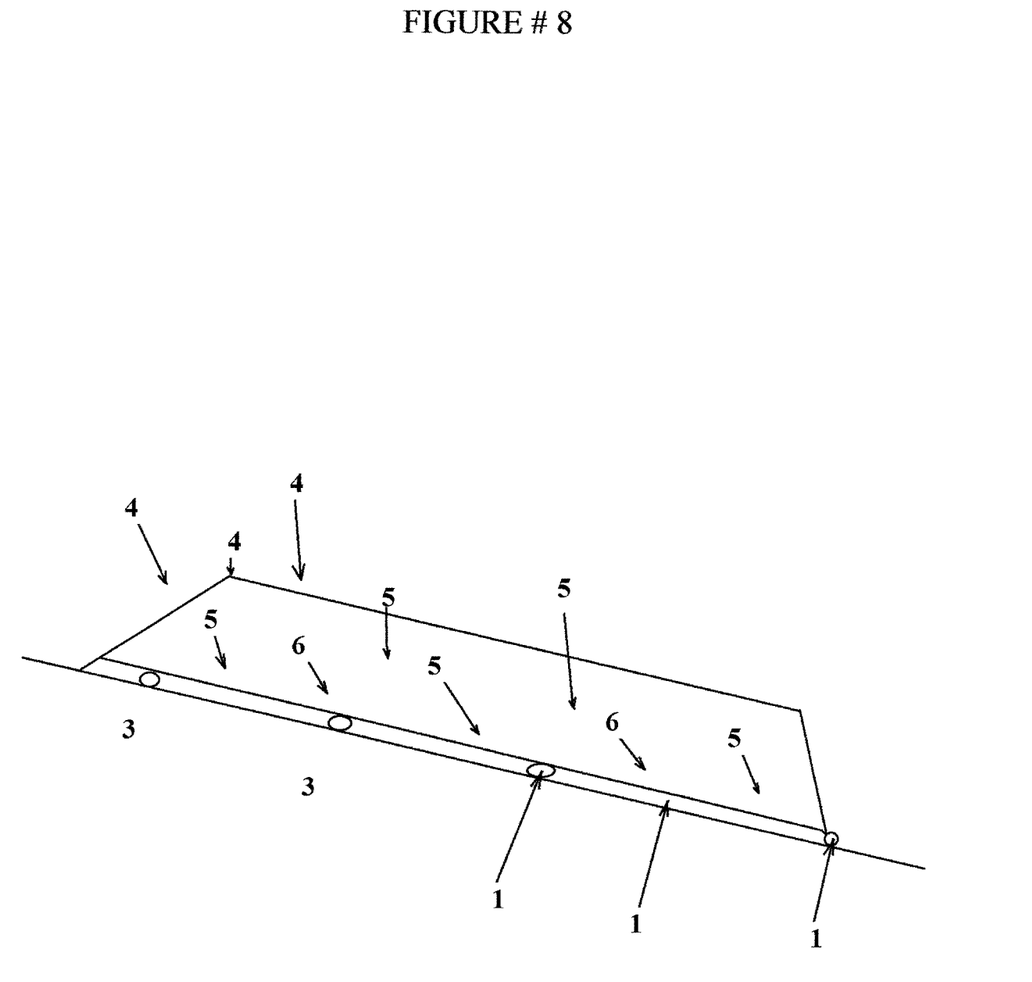

FIG. 8 Organic Pile Cross Section, Large Surface Area Pile on Slope

FIG. 8 illustrates a pile (#2) on a slope with drainage media underneath it in a relatively low height dimension. This provides for a significantly larger surface area/volume. The large surface area provides increased infiltration area for the liquids that are used to process the materials.

Figure Detail by Number Reference
1. Drainage media—any type
2. Pile of material
3. Subgrade
4. Liquid addition (typical)—any type—mist, wet, spray, soak, flood, drench, etc.
5. Gas flow (typical)
6. Liquid flow (typical)
7. Filling area—solids (typical)
8. Material removal area—solids (typical)

I claim:

1. A method of biological treatment that breeds, develops, maintains, controls, and/or manipulates microbial populations in all or part of one or more volumes of material, which also contain some organic material by:

Development of increased microbial populations that provide microbial activity that processes organic materials;

providing said one or more volume or volumes of material, which contains some organic material, also contains liquids, liquid-solid mixtures, sludges, or slurries;

providing said one or more volume or volumes of material, which contains some organic material, which also contains gasses;

providing one or more gravity drainage apparatus or apparatuses that are pipe, aggregate, or any other material or combination of materials capable of providing collection and gravity movement of liquids, solids, or gas or any combination thereof for the purpose of avoiding stagnant conditions;

providing said one or more volume or volumes of material, which contains some organic material, that also contains or is adjacent to said one or more gravity drainage apparatus or apparatuses, for collecting or removing or both of any available liquids, solids, or gas or any combination thereof from within or around said one or more volume or volumes of material;

providing said one or more volume or volumes of material, which contains some organic material, that also contains said increased microbial populations within said one or more volume or volumes of material;

adding new material, which contain some organic material, and removing biologically processed materials which contain some organic material, to said one or more volume or volumes of material, which contains some organic material, in order to provide energy for the breeding, developing, maintaining, controlling, and/or manipulating of said increased microbial populations and increasing the amount of organic material that is biologically processed;

providing said increased microbial populations, within said one or more volume or volumes of material, which contains some organic material, that is accomplished through gravity removal of said available liquids, solids, or gas or any combination thereof by said one or more gravity drainage apparatus or apparatuses, without the use of pressurization, vacuum, or other non-gravity powered drainage apparatus or method;

providing one or more liquid moving apparatus, with the capability of applying liquid or liquid-solid mixtures or both, inside, on top of, on the sides of or any combination of location or locations, of said one or more volume or volumes of material, which contains some organic material;

providing said applied liquid or liquid-solid mixtures, which consist of liquid or liquid-solid mixtures recovered from said one or more gravity drainage apparatus or apparatuses, new liquid or liquid-solid mixtures, or any combination of the two;

providing said new liquid or liquid-solid mixtures, which consist of water, clean water, sewage, slurries, sludges, microorganism in water, nutrients, waste containing liquid, waste added to liquids, or any other liquid or mixture;

providing or allowing the infiltration or contact of said liquid or liquid-solid mixtures delivered by said one or more liquid moving apparatus, into or onto said one or more volume or volumes of material, which contains some organic material;

adding said liquids or liquid containing mixtures, with said one or more liquid moving apparatus such that said liquid, liquid-solid mixtures, and/or gasses move through said one or more volume or volumes of material, which contains some organic material;

collecting or removing or both said available liquid or gas or both liquids and gas within or around said one or more volume or volumes of material, which contains some organic material, with said gravity drainage apparatus or apparatuses, such that there is movement or flow of said liquids, solids, or gas or any combination thereof through said one or more volume or volumes of material, between a point of infiltration or contact and said one or more gravity drainage apparatus or apparatuses;

providing or allowing the said flow of liquids, solids, or gas or any combination thereof through or over said one or more volume or volumes of material, which contains some organic material, results in the movement of liquids, solids, or gasses, through any part of said one or more volume or volumes of material, such that increased microbial populations within said one or more volume or volumes of material, microbially process organic materials;

providing or allowing the said liquid or liquid-solid mixture addition, said gravity drainage apparatus or apparatuses, said movement of liquids, solids, or gas or any combination thereof, and said movement of liquids, solids, or gasses through any part of said one or more volume or volumes of material, results in increases in the population, evolution, manipulation, and/or adjustment of said increased microbial populations within or on the exterior of said one or more volume or volumes of material, which contains some organic material;

providing or allowing the said increases in microbial population to achieve said increased microbial populations in or on said one or more volume or volumes of material, which contains some organic material, results in increased ability of said increased microbial populations to provide microbial processing of organic materials in said one or more volume or volumes of material, which contains some organic material;

providing or allowing the said liquid or liquid-solid mixtures application, said gravity drainage apparatus or apparatuses, and said flow of liquids, solids, or gas or any combination thereof, results in the distributing and/or movement of microorganisms, nutrients, heat, as well as said movement of liquids, solids, or gasses required for said microbial processing of organic material in or on said one or more volume or volumes of material, which contains some organic material;

wherein said volume or providing volumes of organic material that are added are not compost or other previously processed materials, which are avoided because they do not provide energy to maintain and/or enhance the increased microbial population and simply take up volume that could be used for processing organic material.

2. A method, as in claim 1, providing or allowing the said one or more volume or volumes of material, which contains some organic material, that contains or is adjacent to a sufficient number of said one or more gravity drainage apparatus or apparatuses, such that one or more increased microbial populations exist in some part of or all of said one or more volume or volumes of material, which contains some organic material, due to said movement of liquids, solids, or gasses into said one or more volume or volumes of material, due to said movement or flow of said liquids, solids, or gas or any combination thereof, through said one or more or volumes of material, between a point of infiltration or contact and said one or more gravity drainage apparatus or apparatuses.

3. A method, as in claim 1, that maintains the quality and/or quantity of the microbial population available to process organic matter by adding additional said gravity drainage apparatus or apparatuses until stagnation and/or saturation is minimized or avoided, while breeding, developing, maintaining, controlling, and/or manipulating the microbial population available in the organic materials being processed.

4. The method, as in claim 1, where increased organic material processing capacity is achieved by breeding, developing, maintaining, controlling, and/or manipulating microbial populations in/on said one or more volume or volumes of material, which contains some organic material and/or said increased microbial populations in said extracted liquid or liquid-solid mixture, from extraction to reapplication with said one or more liquid moving apparatus.

* * * * *